March 10, 1953 J. H. BOOTH 2,631,044
FRONT WHEEL SUSPENSION
Filed May 1, 1948 2 SHEETS—SHEET 1
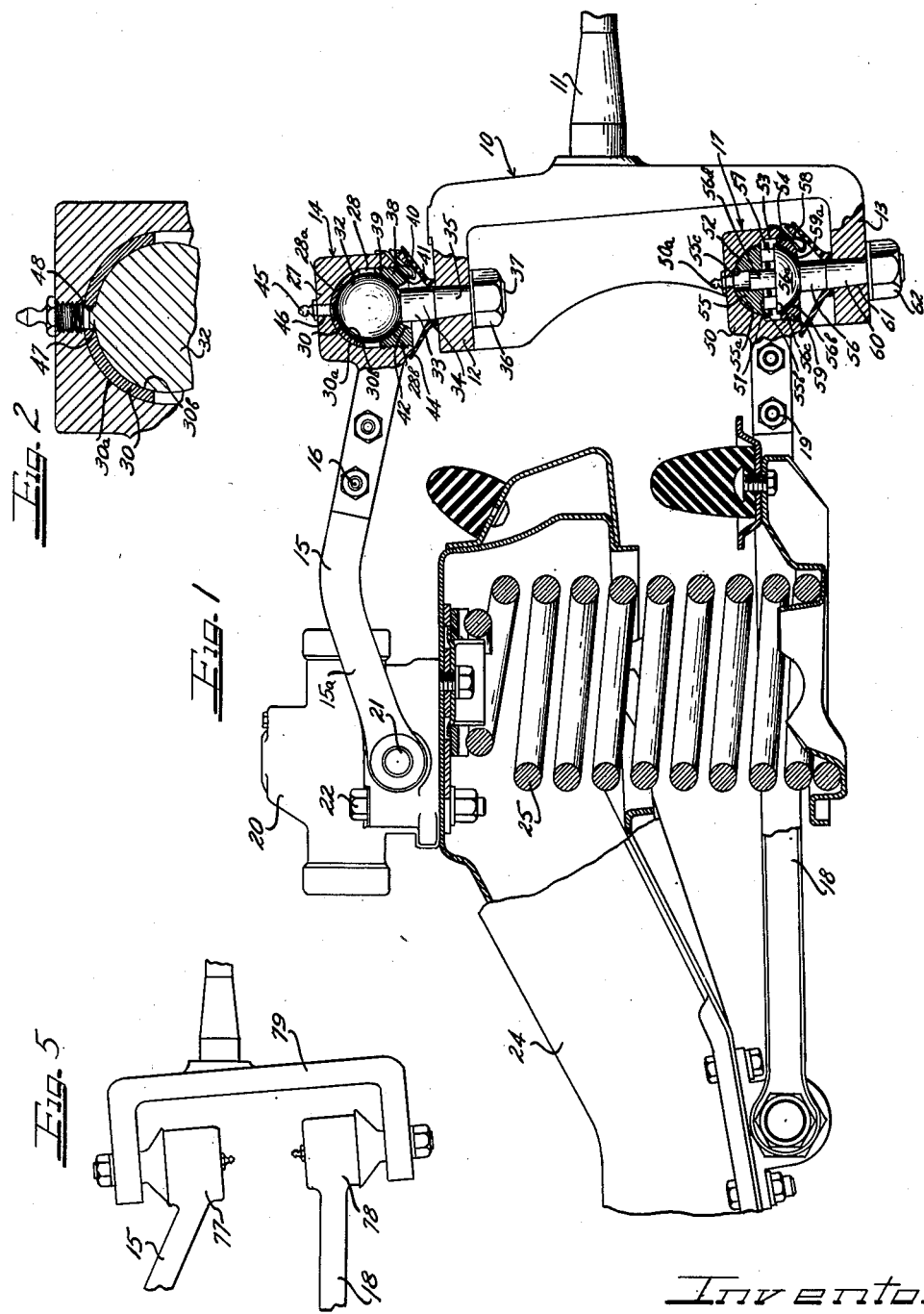
Inventor
JAMES H. BOOTH
by The Firm of Charles A. Hill Attys.

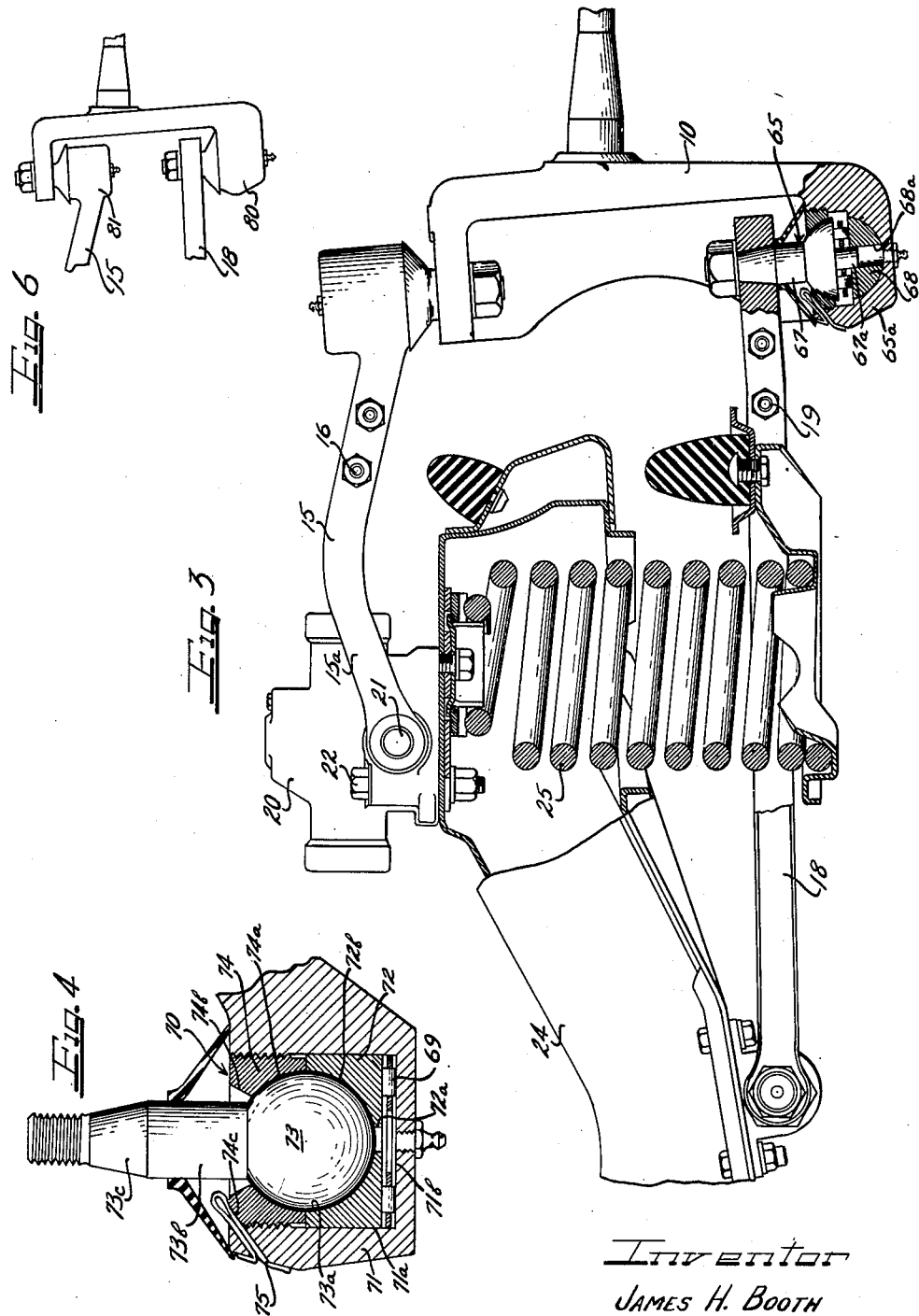

Patented Mar. 10, 1953

2,631,044

UNITED STATES PATENT OFFICE 2,631,044

FRONT WHEEL SUSPENSION

James H. Booth, Township of Venice, Shiawassee County, Mich., assignor to Thompson Products, Inc., Cleveland, Ohio, a corporation of Ohio Application May 1, 1948, Serial No. 24,612

3 Claims. (Cl. 280—96.2)

This invention relates to independent wheel suspension apparatus for automobiles. More particularly, this invention relates to improved joint arrangements between the wheel control arms and spindles of independent wheel suspensions whereby loads are directly borne by joint bearing surfaces without loading threaded connections between the arms and spindles.

This application is a continuation-in-part of my copending application on a "Front Wheel Suspension," Serial No. 781,996, filed October 24, 1947 now U. S. Patent No. 2,521,335 issued September 5, 1950. This parent patent discloses and claims a wheel suspension embodying an anti-friction load-carrying joint and a friction dampening joint which deliberately imparts resistance to free rotation. The present invention is an improvement of this wheel suspension wherein the weight of the vehicle exerts compression load on the load-carrying anti-friction joint stud.

In front wheel suspensions of the type to which this invention relates, the weight load of the vehicle is transmitted to the front wheel through a spring-suspended lower control arm pivoted on the vehicle. In some installations, the shock load due to operation on uneven surfaces or the like is taken by an upper control arm acting through a shock absorber mounted on the vehicle frame. In other installations, the upper control arm is directly pivoted to the vehicle frame and the shock absorber is mounted to take the shock load from the lower arm. In both of these types of installations, the upper and lower control arms are usually connected through a spindle to the adjacent road wheel. The road wheel is thus permitted to pivot with the spindle on a center line formed by the axes of swivel joints disposed at the outer ends of the lower and upper control arms.

It will be readily seen, therefore, that the lower control arm is pressed downwardly by the weight of the vehicle while the road wheel exerts, through the spindle, an upward force supporting the downward load. Thus, the joint connection between the lower control arm and the spindle must afford means for supporting the weight of the vehicle and, at the same time, permit easy steering movement of the wheel.

In my aforesaid parent application, Serial No. 781,996, now Patent Number 2,521,335, the control arms and spindle were articulately connected by ball joints, but shock and weight loads were transmitted between the control arms and spindle through threaded-together joint studs and nuts.

According to the present invention, ball type swivel joints are disposed at the outer ends of the control arms for connection to the spindle in such a way that at least the weight loads are borne directly by bearing surfaces especially designed to carry such loads. Whereas heretofore the spindle was disposed between the control arms, the present invention provides arrangements where at least the lower control arm is straddled by or disposed within the spindle. In one arrangement, the outer end of the lower control arm presses downwardly on a tapered portion of the ball stud shank for transmitting the weight directly through the ball stud to the bearing surfaces in a joint housing or socket provided by the spindle. In a second arrangement, the socket portion of the ball joint is mounted on the lower control arm and the lower end of the spindle presses upwardly on a tapered portion of the ball stud for transmitting the reaction of the wheel directly through the ball stud to the bearing surface.

In the case of the upper control arm joint connection, an advantageous arrangement results when the socket portion of the ball joint is disposed on the outer end of the control arm with the end of the spindle acting downwardly on a tapered portion of the ball stud to transmit the thrust load directly to the bearing surfaces.

Thus, in these arrangements, the loads resulting from the operation and the weight of the vehicle always tend to press the elements of the ball joints together against a bearing surface, and at no time are any of the loads carried by structural members such as the threads of the ball stud.

It is, therefore, an object of this invention to provide a mounting for the swivel joints of an independent front wheel suspension in which the loads are directly borne by bearing surfaces especially designed to carry such loads.

Another object of this invention is to provide mountings for swivel joints of independent wheel suspensions in which the socket portion of the swivel joint is secured to or integrally formed on the spindle.

A further object is to provide a ball joint-equipped independent wheel suspension wherein the wheel spindle straddles at least the lower control arm, so that loads are borne directly by the bearing surfaces of the joint.

A further object of this invention is to provide, in a ball joint equipped independent wheel suspension, an efficient arrangement of the ball joints for carrying weight and shock loads while at the same time providing easy steering of the road wheels and dampening out vibration and wheel shimmy.

Other and further objects of this invention will be apparent to those skilled in the art from the following detailed description of the annexed sheets of drawings, which illustrate several embodiments of the invention.

On the drawings:

Figure 1 is a fragmentary vertical sectional view, partly broken away, of a portion of the front wheel suspension device of this invention;

Figure 2 is an enlarged fragmentary vertical sectional view of a portion of the device of Figure 1, particularly showing the bearing shell locking means on the head of the ball stud;

Figure 3 is a fragmentary vertical sectional view, partly broken away of a portion of a modified form of the front wheel suspension device of this invention, illustrating particularly how the socket portion of the ball joint may be integrally formed with the spindle of the wheel;

Figure 4 is an enlarged vertical sectional view showing a modified form of a ball joint which may be used in the front wheel suspension of this invention.

Figure 5 is a more or less diagrammatic showing of a modified arrangement of a ball joint and spindle connected in accordance with the teaching of this invention; and Figure 6 is a more or less diagrammatic showing of a second modified arrangement of the ball joint and spindle for a wheel suspension.

As shown on the drawings:

In Figure 1, a right front wheel suspension arrangement is illustrated as viewed from the rear of the car. It is believed that the invention will be adequately understood when described in connection with the right side of the front wheel suspension system, although it will, of course, be recognized that the complete system includes an identical suspension device oppositely disposed at the left side of the vehicle.

The reference numeral 10 indicates a spindle assembly having a tapered wheel supporting portion 11 and laterally projecting upper and lower arm members 12 and 13, respectively. The upper arm 12 is mounted for swinging, steering movement in a ball joint 14 secured by means of bolts 16 at the free end of an upper control arm 15. The lower arm 13 is pivotally secured in a ball joint 17 which is connected by means of bolts 19 in the free end of a lower weight supporting control arm 18.

At its inner end, the upper control arm 15 has a yoke portion 15a which straddles a shock absorber 20, the arms of the yoke being attached to opposite ends of a rotatable shaft 21 projecting from either side of the shock absorber. A plurality of bolts 22 secure the shock absorber to a cross frame member 24 of the vehicle. A resilient member, such as a coil spring 25, is secured to an outer portion of the frame 24 directly below the upper control arm 15 to limit the downward pivoting movement of the arm.

The upper ball joint assembly 14 is arranged to dampen vibrations, to permit pivoting, steering movement of the spindle 10 and, at the same time, to permit oscillating movements of the spindle. This joint comprises a socket portion 27 having a substantially central cavity 28 therein providing at its upper portion a segmental spherical bearing surface 28a and an internally threaded cylindrical portion 28b at the lower end of the cavity. A segmental spherical bearing shell 30 is disposed in the cavity 28 having an outer bearing surface 30a in contact with the spherical bearing surface 28a of the cavity and an inner spherical bearing surface 30b arranged to receive the head portion 32 of a ball stud 33. This stud 33 also has a shank portion 34, and a tapered portion 35 immediately below the shank portion seated in a tapered hole in the upper inwardly projecting arm 12 of the spindle. A lock nut 36 is fitted on a lower threaded portion 37 of the ball stud to urge the tapered portion of the stud into its seat on the spindle arm.

The stud is held up in the joint assembly by a circular plug member 38 having an inner segmental spherical bearing surface 39 and an outer threaded portion by which it engages the threaded portion 28b of the cavity 28. The plug 38 may be locked in the cavity of means of a cotter pin 40 which is positioned through a slanted hole of the socket 27, having one end disposed in a notch 41 of the plug. The plug 38 has a segmental cone-shaped opening 42 in the lower portion through which the shank of the ball stud projects for swinging, pivoting movement therein. To prevent dirt from entering the assembly there is disposed around the shank portion of the stud a dirt seal 44, which may conveniently be made of leather or of a resilient material such as rubber which has sufficient rigidity to maintain an overlapping position on the lower portion of the socket 27 and a snug fit against the shank of the stud abutting the arm 12 of the spindle.

A grease fitting 45 is threaded into the central portion of the upper surface of the socket communicating with a passage 46 in the socket which leads to the bearing surfaces of the segmental spherical bearing shell 30 and of the ball portion of the ball stud.

Since the lower portion of the ball stud is locked into the spindle, steering movement of the wheels will require that the stud must turn in the ball socket. Such turning will take place between the spherical surface of the ball portion of the stud and the inner segmental spherical bearing surface 30b of the bearing shell 30.

Bouncing of the wheel on uneven surfaces would require that the stud 33 oscillate in the ball joint assembly permitting the pivoting movement of the control arm. Such oscillation will require that the outer bearing surface 30a of the spherical bearing 30 move in relation to the spherical surface 28a of the socket. In this assembly, this movement is brought about due to a locking device disposed between the ball portion of the stud and the spherical bearing shell 30. In Figure 2 an enlarged view of this locking device is shown. It comprises a cylindrical arm portion 47 extending outwardly from the head portion 32 of the ball stud to engage in a cylindrical hole 48 in the bearing shell 30. Thus the ball stud can rotate in the bearing shell without causing movement of the bearing shell, as when steering of the wheel is carried out, but pivoting or oscillating movement of the ball end of the stud will cause the bearing shell to move with the ball end of the stud thereby causing relative movement between the outer spherical bearing surface 30a of the bearing shell 30 and the inner spherical bearing surface 28a of the socket.

The lower ball joint 17 connected at the free end of the lower control arm must support the weight of the vehicle, permit oscillating of the spindle arm relative to the lower control arm to accommodate wheel bounce and must permit free rotation of the stud in the assembly to accommodate steering movements of the wheel.

This stud comprises a socket 50 having a cavity 51 therein, disposed substantially centrally and providing an upper segmental spherical bearing surface 52 and a substantially cylindrical cavity portion 53 having a threaded portion 54 at one end thereof. A segmental spherical bearing 55 having an outer spherical bearing surface 55a, a substantially flat bearing surface 55b and a central cylindrical aperture 55c is arranged to fit into the cavity with the spherical bearing surface 55a in contact with the inner spherical bearing surface of the cavity. A ball stud 56 having a segmental ball head portion 56a with a segmental spherical bearing surface 56b and a flat bearing surface 56c is disposed in the cavity below the bearing 55 having an outwardly projecting substantially cylindrical arm portion 56d extending into the cylindrical aperture 55c of the bearing 55. A bearing assembly 57 is disposed between the flat bearing surfaces of the ball stud and the spherical bearing 55, which bearing assembly may take the form of roller type bearing, as illustrated, a ball bearing assembly or a flat thrust washer. A circular plug 59 is arranged to be threaded into the threaded portion 54 of the cavity with a spherical bearing surface 59a abutting the spherical bearing surface of the ball stud, urging said ball stud upwardly against the bearing assembly 57. A cotter pin 58 disposed between the plug 59 and the socket 50 is arranged to lock the plug in position. The shank of the ball stud has a tapered portion 60 seated in a similarly tapered hole 61 in the lower arm 13 of the spindle and held therein by a nut 62 threaded on the lower portion thereof.

A grease fitting 50a is threaded into the upper central portion of the socket 50 to provide means for distributing lubricant to the bearing surfaces of the ball joint and a dirt shield 58 similar to the dirt shield 44 described in connection with the ball joint 14 is disposed around the lower portion of the ball joint assembly.

Turning of the stud in the ball joint to accommodate steering movement of the wheels is provided for by the bearing assembly 57 and the cylindrical arm portion 56d of the stud which extends into the opening 55c of the bearing 55. The stud is therefore permitted to pivot on its own axis without effecting movement of the bearing 55.

Oscillation of the ball stud in the bearing assembly to accommodate wheel bounce is effected through the bearing 55 which due to the interaction of the arm 56d of the ball stud 56 pivots in the socket 50 on the segmental spherical bearing surface 50a thereof.

It is to be particularly noted that the reaction of the wheel to the load of the vehicle, which causes an upward force to be exerted through the arm 13 of the spindle, tends to force the bearing 55 and the head of the ball stud 56 toward each other and against the bearing assembly. Thus the weight of the vehicle is borne directly on the bearing assembly.

In Figure 3 a front wheel suspension identical to that of Figure 1 is illustrated. In this embodiment, however, the lower ball joint 65 is identical to the lower ball joint 17 of Figure 1 except that it is disposed in an inverted position with the socket portion 65a of the ball joint formed integrally with the arm of the spindle 10. The action of this ball joint, of course, is identical to the action of ball joint 17 with steering movement of the spindle 10 taking place on the central axis of the stud 67, which is permitted to rotate in the bearing 68 without moving the same. Oscillation of the stud 67 is provided for by the interaction of the projecting arm 67a which extends into the cylindrical opening 68a of the bearing 68.

It is again to be noted that the upward reaction of the wheel tends to press the members of the bearing against the roller bearing assembly in the ball joint. Thus again the entire weight of the vehicle is supported on the ball stud.

In Figure 4 is illustrated a modified embodiment of the ball joint of the present invention. This ball joint 70 comprises a socket member 71 having a substantially central cylindrical cavity portion 71a with a flat bearing surface 71b on which is disposed a thrust bearing assembly 69 which may be roller bearings, as illustrated, ball bearings, or flat thrust washers. A substantially cylindrical bearing member 72 is disposed in the cavity 71a having a central cylindrical opening 72a and a substantially central segmental spherical bearing surface 72b for receiving the spherical head 73a of a ball stud 73. A cylindrical plug member 74 having a spherical bearing surface 74a is disposed around the head of the stud having a central opening 74b of a substantially segmental conical form which receives a shank portion 73b of the stud therethrough for pivoting, rotative movement. The outer surface of the plug is threaded into a similarly threaded portion of the cavity 71a to lock the ball stud in position in the bearing assembly. A cotter pin 75 disposed in the socket 71 and in a notch 74c of the cylindrical plug 74 prevents the plug from backing out of the cavity. A tapered portion 73c is provided on the ball stud 73 which is arranged to be fitted into a tapered hole of a supporting member, such as a lower control arm.

Steering movement of the spindle is provided for in this embodiment by the spherical ball head which may rotate in the bearing surfaces 72b and 74a of the bearing member 72 and the cylindrical plug 74 respectively.

Similarly, the head on the ball stud is free to oscillate in its socket to accommodate oscillation due to wheel bounce.

It will, of course, be understood that the ball joint of Figure 4 can be used in a wheel suspension system in the same manner as ball joint 17 of Fig. 1 with the socket portion connected to the lower control arm or as in Figure 3 wherein the ball joint 65 has its socket member formed integrally with the spindle.

Figure 5 is a diagrammatic view of a portion of a front wheel suspension showing an installation wherein both the upper and lower ball joints 77 and 78 respectively are disposed inside the arms of the spindle 79 having their socket portions formed integrally with the control arm.

Figure 6 shows another embodiment of this invention wherein the lower ball joint 80 has its socket portion integrally formed with the spindle arm while the upper ball joint 81 has its socket portion formed integrally with or secured to the upper control arm. It is also to be noted that in this case the lower ball joint 80 is disposed beneath the lower control arm and the upper ball joint is disposed beneath the spindle arm. Similarly it is to be noted that in all forms of this invention the lower arm of the spindle is disposed beneath the associated free end of the lower control arm. Thus, in all cases, the reaction of the wheel which acts upwardly through the spindle arm tends to press the bearing assembly upwardly against the downwardly pressed free end of the lower control arm. Therefore, the entire weight of the vehicle will be carried on bearing surfaces.

It is also a feature of the installations illustrated in Figures 5 and 6 that the upper arm of the spindle, acting downwardly when the wheel drops into a hole, tends to press the bearing assembly together and to transmit the load to the thrust bearing assembly.

The ball joints of Figures 5 and 6 may take the form of any of the ball joints described in this invention.

There is thus provided in this invention a plurality of ball joint mountings which are so designed that the weight of the vehicle will be carried on the bearing surfaces of the lower ball joint and will never be partially carried by any mechanical fitting, such as the threaded portion of the ball stud. The lower ball joints of this invention provide easy steering movement of the spindle and free oscillation of the ball stud in the joint even though carrying the entire weight of the vehicle. The upper ball joint provides free oscillation to accommodate wheel bounce and also permits rotation of the stud in the ball assembly to accommodate steering movement of the spindle.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an independent dirigible wheel suspension for a vehicle including a pivotally mounted load-carrying wheel arm, a pivotally mounted second wheel arm, a wheel knuckle having a portion below the load-carrying arm, ball joints each including a headed stud and an internal bearing wall equipped socket connecting the wheel knuckle and arms to accommodate pivoting suspension action of the arms and rotating steering movement of the knuckle, a bearing ring having an external bearing wall tiltable on the bearing wall of the socket for the load-carrying arm at a surface opposite the stud and accommodating pivotal wheel suspension action, the head of said stud having a bearing surface facing away from the stud, said ring having a cooperating bearing surface facing said stud, rolling anti-friction elements between said cooperating surfaces accommodating free relative rotating movements of the stud and the ring to facilitate rotating steering movement of the knuckle, said stud of the load-carrying arm joint being positioned between the load-carrying arm and the said portion of the wheel knuckle below the load-carrying arm to transmit the weight of the vehicle in direct compression through the stud and anti-friction bearing elements to the wheel knuckle, the stud and socket of the joint for the second arm being provided with opposed coacting, vibration-damping, bearing surfaces accommodating pivoting wheel-suspension action and rotating steering action of the stud and socket.

2. In an independent steerable wheel suspension including a lower load-carrying wheel arm, an upper wheel arm, a wheel knuckle having a portion below the lower load-carrying wheel arm, ball joints each including a stud having a body portion and a head and an internal bearing wall equipped socket connecting the wheel knuckle and arms, the ball joint connecting the load-carrying wheel arm and the knuckle having the stud thereof in compression under the load on the arm, a bearing in the load-carrying socket having an external segmental spherical bearing wall tiltable on the bearing wall of the socket at a surface opposite from said stud body for mounting the stud in the socket to accommodate suspension movement of the wheel arms, and having a second bearing surface facing an end surface of said stud head, rolling antifriction elements between said end surface and the second bearing surface for facilitating rotation of the stud relative to the bearing to accommodate free steering rotation of the knuckle, said load-bearing ball joint stud having a surface in compression with an opposed conforming surface on the portion of the knuckle lying below the load-carrying wheel arm to transmit the compression load through the stud and the joint directly from the load carrying arm to the wheel knuckle, and said ball joint connecting the upper wheel arm to the wheel knuckle comprising a controlled-friction vibration-damping joint.

3. In an independent dirigible wheel suspension for a vehicle including a pivotally mounted load-carrying arm member, a second arm, a wheel knuckle having a portion connected by a ball joint to said second arm and having a support member positioned under said arm member, one of said members having a socket therein, the other of said members having a stud fixedly secured thereto, said stud having a head projecting into said socket, a segmental spherical bearing member in said socket and having an outer bearing surface in tilting cooperation with the surface of said socket opposite said head, said bearing member having an inner surface facing toward said stud head, said stud head having a cooperating end surface facing away from the stud and toward said inner surface, anti-friction rolling members between said cooperating surfaces for providing free relative rotation between the bearing and the stud, whereby both said stud and said rolling members are placed under compressive stress to support said load-carrying arm.

JAMES H. BOOTH.

REFERENCES CITED

The following references are of record in the file of this patent:

UNITED STATES PATENTS

| Number | Name | Date |
| --- | --- | --- |
| 1,983,947 | Rockwell | Dec. 11, 1934 |
| 2,085,738 | Coleman | July 6, 1937 |
| 2,130,288 | Olley | Sept. 13, 1938 |
| 2,137,848 | Macbeth | Nov. 22, 1938 |
| 2,167,984 | Leighton | Aug. 1, 1939 |
| 2,226,406 | Krotz | Dec. 24, 1940 |
| 2,290,923 | Wahlberg | July 28, 1942 |
| 2,388,950 | Booth | Nov. 13, 1945 |
| 2,405,458 | Slack et al. | Aug. 6, 1946 |
| 2,521,335 | Booth | Sept. 5, 1950 |
| 2,544,331 | Kogstrom | Mar. 6, 1951 |
| 2,556,767 | McCann | June 12, 1951 |

FOREIGN PATENTS

| Number | Country | Date |
| --- | --- | --- |
| 806,438 | France | Dec. 16, 1936 |
| 810,040 | France | Mar. 13, 1937 |
| 849,709 | France | Nov. 30, 1939 |